(12) United States Patent
Guntzer et al.

(10) Patent No.: US 11,713,112 B2
(45) Date of Patent: Aug. 1, 2023

(54) METHOD AND A SYSTEM FOR REDUCING THE IN-FLIGHT NOISE FROM A HYBRID HELICOPTER BY MANAGING THE ANGLE OF INCIDENCE OF ITS MAIN ROTOR AND THE THRUST FROM EACH PROPELLER

(71) Applicant: AIRBUS HELICOPTERS, Marignane (FR)

(72) Inventors: Frederic Guntzer, Gignac la Nerthe (FR); Paul Eglin, Roquefort la Bedoule (FR)

(73) Assignee: AIRBUS HELICOPTERS, Marignane (FR)

( * ) Notice: Subject to any disclaimer, the term of this patent is extended or adjusted under 35 U.S.C. 154(b) by 76 days.

(21) Appl. No.: 17/197,749

(22) Filed: Mar. 10, 2021

(65) Prior Publication Data
US 2021/0291969 A1    Sep. 23, 2021

(30) Foreign Application Priority Data

Mar. 18, 2020 (FR) ...................................... 2002631

(51) Int. Cl.
*B64C 27/26* (2006.01)
*B64C 27/82* (2006.01)
(Continued)

(52) U.S. Cl.
CPC ............ *B64C 27/26* (2013.01); *B64C 11/305* (2013.01); *B64C 27/82* (2013.01); *B64C 27/57* (2013.01);
(Continued)

(58) Field of Classification Search
CPC ... B64C 27/57; B64C 27/58; B64C 2027/823; B64C 27/26; B64C 2220/00
See application file for complete search history.

(56) References Cited

U.S. PATENT DOCUMENTS

| 5,437,419 A | 8/1995 | Schmitz |
| 5,478,029 A | 12/1995 | Schmitz |

(Continued)

FOREIGN PATENT DOCUMENTS

| EP | 1547920 A1 | 6/2005 |
| WO | 2016053991 A1 | 4/2016 |

OTHER PUBLICATIONS

Schmitz, Fredric H. Reduction of Blade-Vortex Interaction (BVI) noise through X-force control. NASA Technical Memorandum 110371. Sep. 1995. 33 pages.
(Continued)

*Primary Examiner* — Timothy D Collins
*Assistant Examiner* — Justin Michael Heston
(74) *Attorney, Agent, or Firm* — Brooks Kushman P.C.

(57) ABSTRACT

A method of reducing the noise generated in-flight by a vortex wake caused by each first blade of a main rotor of a hybrid helicopter. The hybrid helicopter includes a main rotor, at least two wings and at least one propeller. The method enables a stabilized flight phase on the level or with a non-zero aerodynamic slope to be implemented by determining a first value of the pitch of the second blades of each propeller and an angle of incidence of the main rotor as function of the flight conditions, then by applying the first pitch value to each propeller and by applying the angle of incidence to the main rotor so as to direct the vortex wake to limit the noisy interactions between the vortex wake and the other first blades and/or the second blades.

20 Claims, 4 Drawing Sheets

(51) Int. Cl.
    *B64C 27/57*     (2006.01)
    *B64C 11/30*     (2006.01)
(52) U.S. Cl.
    CPC ............... *B64C 2027/8236* (2013.01); *B64C 2027/8272* (2013.01); *B64C 2027/8281* (2013.01); *B64C 2220/00* (2013.01)

(56)         References Cited

U.S. PATENT DOCUMENTS 7,448,571 B1     11/2008  Carter et al.
2005/0045762 A1*   3/2005  Pham ................. B64C 27/26
                                                    244/7 R
2006/0027701 A1     2/2006  Eglin
2018/0319491 A1*  11/2018  Kearney-Fischer ....................
                                                    B64C 39/024
2019/0168622 A1*   6/2019  McRoberts ........... H02J 7/1492
2019/0185149 A1*   6/2019  Pantalone .............. B64D 31/12
2019/0340933 A1*  11/2019  Villa ................... B64C 29/0016
2021/0139138 A1*   5/2021  Clark .................... B64D 27/02

OTHER PUBLICATIONS

French Search Report for French Application No. FR2002631, Completed by the French Patent Office, dated Nov. 12, 2020, 10 pages.

* cited by examiner

METHOD AND A SYSTEM FOR REDUCING THE IN-FLIGHT NOISE FROM A HYBRID HELICOPTER BY MANAGING THE ANGLE OF INCIDENCE OF ITS MAIN ROTOR AND THE THRUST FROM EACH PROPELLER

CROSS-REFERENCE TO RELATED APPLICATIONS

This application claims priority to French patent application No. FR 20 02631 filed on Mar. 18, 2020, the disclosure of which is incorporated in its entirety by reference herein.

BACKGROUND OF THE INVENTION

(1) Field of the Invention

The present invention lies in the field of providing assistance for piloting hybrid helicopters.

The present invention relates to a method and to a system for reducing the in-flight noise from a hybrid helicopter by managing both the angle of incidence of its main rotor and also the thrust from its forward propulsion propellers, and it also relates to a hybrid helicopter equipped with such a system.

The project leading to this invention received funding from the European Union Framework Programme for Research and Innovation Horizon 2020, through the grant agreement CleanSky 2 No. GAM-FRC-2014-001 Issue E.

(2) Description of Related Art

A hybrid helicopter is a particular type of rotorcraft including a fuselage and at least one main rotor that provides the hybrid helicopter with at least part of its lift and/or forward propulsion, and also including one or more forward propulsion propellers that provide the hybrid helicopter with at least part of its forward propulsion. A hybrid helicopter may also include at least two surfaces referred to as "wings" and that provide the hybrid helicopter with at least part of its lift, and at least one horizontal stabilizer that is angularly positionable in full or in part, and that serves to control the longitudinal (pitch) balance of the hybrid helicopter.

For example, a hybrid helicopter includes a single main rotor, two wings arranged transversely on either side of the fuselage, and two forward propulsion propellers, placed on respective ones of the wings. The main rotor and each forward propulsion propeller may be driven in rotation by the same power plant of the rotorcraft. The two propellers are also suitable for performing an antitorque function and thus for enabling the yaw movements of the rotorcraft to be controlled. Each forward propulsion propeller may be a puller propeller or a pusher propeller.

While a rotor is rotating, a free end or "tip" of each blade of the rotor defines a rotor cone, the base of the rotor cone being referred to as the "rotor disk". The angle of incidence of the rotor disk of a rotor is equal to the angle between the rotor disk and the forward direction of the rotorcraft.

For reasons of simplification, the term "propeller" on its own is used below to designate a forward propulsion propeller, and the term "rotor" on its own is used to designate a main rotor. Similarly, the expression "angle of incidence of the rotor disk" is used to designate the angle of incidence of the rotor disk of the main rotor.

Compared with a conventional helicopter, the presence of at least one propeller provides a hybrid helicopter with an additional degree of freedom for piloting and maneuvering the rotorcraft. Indeed, the total thrust necessary for propelling the hybrid helicopter forwards may be shared between each propeller and each rotor. Such sharing also makes it possible to influence the angle of incidence of the rotor disk of each rotor, without adding a dedicated mechanical or aerodynamic device. On a conventional helicopter, it should be remembered that the angle of incidence of the rotor disk of the rotor is imposed by the flight conditions, and in particular by the aerodynamic slope of the helicopter and its forward speed relative to air or "airspeed".

The thrust from each propeller of the hybrid helicopter is controlled via a mean pitch component of its propeller blades while the angle of incidence of each rotor and the aerodynamic force that each rotor generates are controlled via the collective and cyclic pitches of its rotor blades. A collective pitch control enables the amplitude of the aerodynamic force generated by each rotor to be controlled, and a cyclic pitch control makes it possible to tilt the rotor disk and, de facto, to orient its aerodynamic force. As a function of this orientation, the aerodynamic force from each rotor resolves into a lift force contributing to providing the hybrid helicopter with lift, and thrust in addition to the thrust from each propeller so as to contribute to propelling the hybrid helicopter forwards. As a function of the flight phases of the hybrid helicopter and in particular as from a significant forward speed, the wings also contribute to providing the hybrid helicopter with lift via a lift force that is a function, in particular, of the forward speed of the hybrid helicopter.

Combining the flight controls for controlling each propeller and each rotor can make managing the controls of the hybrid helicopter difficult without assistance being provided for piloting.

Furthermore, during the flights of a helicopter, regardless of whether the helicopter is conventional or hybrid, interaction phenomena can take place between each rotating blade of a rotor and air vortices generated by the other rotating blades of the rotor. Indeed, each blade of the rotor tends to cause a vortex wake to appear, and under certain angles of incidence of the rotor, the other blades of the rotor then pass through that wake. These interactions between the blades and the vortex wake then generate noise, e.g. during a landing approach flight and when the rotor disk is at certain angles of incidence.

Such interactions between the blades of a rotor and a vortex wake are known as "Blade-Vortex Interactions" or "BVIs" and they are recognized as being one of the major contributions to the overall noise generated by a conventional helicopter.

In addition, interactions specific to the hybrid helicopter can also take place between a vortex wake generated by the rotor and the rotating blades of the propellers. Such interactions can then generate noise, also when the rotor is at certain angles of incidence.

In addition, other interactions can also take place between the vortex wake generated by each blade of the rotor and the aerodynamic elements situated at the rear of the helicopter, such as the tail boom and horizontal and/or vertical stabilizers. Such interactions do not generate noise, but they can cause vibration in the tail aerodynamic elements that can interfere with piloting the helicopter.

On a conventional helicopter, solutions have been considered for limiting the intensity of the noise generated by such BVIs.

For example, the publication by F. H. Schmitz, "Reduction of Blade-Vortex Interaction (BVI) Noise through X-Force Control", NASA Technical Memorandum 110371, September 1995, describes devices for modifying the angle of incidence of the rotor disk for a fixed flight-path slope and for a fixed flight speed, under stabilized flight conditions. Those devices are, in particular, designed to generate at least an aerodynamic force parallel to the direction of travel of the rotorcraft in order to modify the balance of the rotorcraft, and, as a result, in order to modify the angle of incidence of the rotor disk so as to attempt to limit the noise that is emitted. That aerodynamic force parallel to the direction of travel of the rotorcraft may be an aerodynamic drag or else a thrust force.

Documents U.S. Pat. Nos. 5,478,029 and 5,437,419 disclose examples of such devices more specifically. A device for increasing the aerodynamic drag of the rotorcraft can include aerodynamic obstacles, such as, for example, flaps, which are deployable and/or angularly positionable in the airflow sweeping over the rotorcraft. For example, a device generating a thrust force may comprise two propellers arranged on either side of the fuselage. Those two propellers generate a thrust force that can be constant regardless of the speed of the rotorcraft, and oriented towards the front or towards the rear of the rotorcraft, then causing a constant variation in the angle of incidence of the rotor disk of the rotorcraft.

However, those devices penalize operation of the rotorcraft, since they lead both to a significant increase in the aerodynamic drag of the rotorcraft, in particular during landing approach phases, and also to a significant increase in the weight of the rotorcraft. In addition, such devices can be complex to implement.

Furthermore, Document U.S. Pat. No. 7,448,571 discloses a rotorcraft provided with a rotor, with two wings, and with one propulsion propeller. The propulsion propeller provides the rotorcraft with its forward propulsion and the wings provide the rotorcraft with the majority of its lift during cruising flight, the rotor then being driven in rotation by the incident airflow. In addition, the mast of the rotor is tiltable towards the front or the rear of the rotorcraft in order to modify the angle of incidence of the rotor disk so as to maintain a desired speed of rotation for the rotor, in particular no less than a minimum speed.

The prior art also includes Document WO 2016/053991 that discloses an aircraft having a fuselage, two coaxial and contra-rotating main rotors, and a thrust propeller positioned at the end of a tail boom. In order to reduce the noise generated during certain flight phases, that aircraft proposes to reduce the speeds of rotation of the main rotors and/or of the thrust propeller.

Document EP 1 547 920 discloses a method and a device for reducing the vibration generated on the structure of a rotorcraft by an airflow through the main rotor of that rotorcraft and by an airflow along the fuselage of said rotorcraft. That device measures the vibration generated on the structure and, on the basis of those measurements, computes a variation in the angle of incidence of a stabilizer of the rotorcraft that can generate a force opposing the vertical vibration, and applies that variation in angle of incidence to the stabilizer in order to reduce that vibration.

Finally, Document US 2005/045762 discloses a convertiplane including a single tiltable rotor that is fastened above the fuselage and an antitorque rotor that is arranged at the end of a tail boom, a propeller arranged at the rear of the fuselage, and two wings. The tiltable rotor is fastened in such a manner as to slide longitudinally relative to the fuselage and as to pivot. In horizontal cruising flight, the tiltable rotor is moved forwards to the maximum extent towards the front of the fuselage, and it is then pivoted so that its blades can rotate in front of the fuselage. In upward flight, the tiltable rotor is positioned above the fuselage. Those particular configurations of the main rotor and of the auxiliary rotors enable the noise caused by the vortex wake generated by the blades of the tiltable rotor in flight to be limited.

BRIEF SUMMARY OF THE INVENTION

An object of the present invention is to provide a method and a system designed for a hybrid helicopter and aiming to reduce the noise caused by the vortex wake generated by each blade of a rotor of the hybrid helicopter in flight, and in particular the noise caused by the BVIs.

An object of the present invention is also to provide a hybrid helicopter equipped with such a system.

The present invention thus provides a method of reducing in-flight noise for a hybrid helicopter. This hybrid helicopter includes:

at least one rotor provided with a plurality of first blades and providing the hybrid helicopter with at least part of its lift and/or forward propulsion;

at least one propeller provided with a plurality of second blades and providing the hybrid helicopter with at least part of its forward propulsion;

an automatic piloting device for automatically piloting the hybrid helicopter; and at least one calculator.

Such a hybrid helicopter may also include a fuselage, at least two wings providing the hybrid helicopter with at least part of its lift, at least one display device and at least one sensor designed to measure or to determine the flight conditions of the hybrid helicopter.

For example, the calculator may be dedicated to implementing this method of the invention or indeed it may be shared for performing other functions of the hybrid helicopter and, in that capacity, it may be integrated into an avionics system of the hybrid helicopter. For example, the calculator may comprise at least one processor and at least one memory, at least one integrated circuit, at least one programmable system or indeed at least one logic circuit, these examples not limiting the scope given to the expression "calculator". For example, the memory may store one or more algorithms for the purpose of implementing the method of the invention, as well as one or more databases.

The method of the invention is remarkable in that it includes the following steps:

determining flight conditions of the hybrid helicopter using at least one sensor of the hybrid helicopter, said flight conditions including a speed relative to air of the hybrid helicopter and an aerodynamic slope of a path followed by the hybrid helicopter;

determining a first value of a first characteristic of said at least one propeller using a first database and as a function of said flight conditions;

determining a second value of a second characteristic of said at least one main rotor using a second database and as a function of said first value of said first characteristic of said at least one propeller so as to limit noise generation due to a vortex wake generated by each rotating first blade of said at least one main rotor; and implementing a stabilized flight phase of the hybrid helicopter by applying the first value of the first characteristic to said at least one propeller and by applying the second value of the second characteristic to said at least one main rotor.

In this manner, the first value of the first characteristic of each propeller and the second value of the second characteristic of said at least one rotor advantageously enable the total thrust necessary for the forward propulsion of the hybrid helicopter to be shared so that each rotor has an angle of incidence that is optimized as a function of the flight conditions. Controlling the angle of incidence of the rotor disk serves to limit the noise generation due to the vortex wake generated by each first blade of the rotor.

By means of this optimized angle of incidence of each rotor, the vortex wake of each first blade is thus directed so as to have limited or zero contact with the other first blades of said rotor, thereby limiting occurrence of BVIs generating high noise that can be a nuisance for the surrounding environment of the hybrid helicopter.

By means of this optimized angle of incidence of each rotor, the vortex wake of each first blade of the rotor may also be directed so as to have limited or zero contact with the second blades of each propeller, thereby limiting occurrence of interactions between said vortex wake and the rotating second blades, such interactions also generating noise.

The vortex wake generated by each first blade of the rotor may also be directed so as to have limited or zero contact with rear aerodynamic elements of the hybrid helicopter, such as horizontal and/or vertical stabilizers as well as the tail boom, in order to limit occurrence of vibration in such rear aerodynamic elements.

For example, for a hybrid helicopter including a rotor and two propellers situated under the rotor, an optimized angle of incidence of the rotor may enable the interactions to be limited and advantageously to direct each vortex wake substantially between the first blades of each rotor and the second blades of each propeller.

The direction taken by a vortex wake may be a function firstly of the angle of incidence of the rotor disk and secondly of the aerodynamic slope of the forward path of the hybrid helicopter. Advantageously, each first value of the first characteristic of each propeller from the first database is defined as a function of the aerodynamic slope as well as of the forward speed relative to air of the hybrid helicopter.

In a second database, each first value of the first characteristic of a propeller is associated with a second value of the second characteristic of each rotor so that simultaneously applying the first value of the first characteristic to each propeller and the second value of the second characteristic to each rotor enables the vortex wake generated by each rotating first blade to be directed in order to limit noise generation due to said vortex wake. The first database and the second database may optionally be merged to form a single, common database.

The first values relating to the first characteristic of each propeller and the second values of the second characteristic of each main rotor that are associated with respective ones of the first values of the first characteristic may be determined by computation by involving a flight mechanics model that defines the balances of the hybrid helicopter as a function of various flight conditions and the total speed of the airflow through the rotor as well as the positions of flight controls of the hybrid helicopter. This computation may be implemented in the form of numerical simulations that, in particular, represent the vortex wake generated by each first blade and propagation of said vortex wake towards the other first blades and the second blades, as well as possibly towards the rear aerodynamic elements of the hybrid helicopter.

The results of these numerical simulations, and in particular their effects on the vortex wake interactions and on the generated noise may optionally then be validated by in-flight trials.

Said first values of the first characteristic and said second values of the second characteristic may also be determined as a result of campaigns of in-flight trials instead of the numerical simulations.

The first database and the second database may be established during a preliminary step of this method, during which step databases are established. This preliminary step may, for example, be performed while the hybrid helicopter is being developed, or after such development.

Said first database takes into account the flight conditions of the hybrid helicopter and its specificities, including not only its geometrical specificities but also its aerodynamic and mechanical specificities. Each database may thus be dedicated and specific to each type of hybrid helicopter.

The first database may define an array of first optimized curves for limiting to as low as possible the interactions with the vortex wake generated by each first blade of the rotor. Each first optimized curve puts the first characteristic of each propeller and the speed relative to air of the hybrid helicopter into relation with each other, each first optimized curve corresponding to an aerodynamic slope of the path of the hybrid helicopter.

The first database may also include an array of optimized ranges, each optimized range putting the first characteristic of each propeller and the speed relative to air of the hybrid helicopter into relation with each other, each optimized range corresponding to an aerodynamic slope of the path of the hybrid helicopter.

A first limit for an optimized range, e.g. the upper limit, may correspond to the maximum first values of the first characteristic above which values a BVI occurs between the first blades and the vortex wake, while a second limit for said optimized range, e.g. the lower limit, may correspond to the minimum first values below which an interaction occurs between the second blades and the vortex wake.

The first database may include tables of values, a succession of mathematical instructions, or indeed one or more equations corresponding to said optimized curves, or indeed to the optimized ranges.

The first database may also include a numerical simulation algorithm putting, in particular, the characteristic of each propeller, the forward speed relative to air of the hybrid helicopter, and the aerodynamic slope of the path of the hybrid helicopter into relation with one another.

Similarly, the second database may define an array of second curves, each second curve putting the first characteristic of each propeller and the second characteristic of each rotor into relation with each other, each second curve corresponding to an aerodynamic slope of the path of the hybrid helicopter.

Here too, the second database may include tables of values, a succession of mathematical instructions, or indeed one or more equations corresponding to said second curves.

The second database may also include a numerical simulation algorithm putting, in particular, the first characteristic of each propeller, the second characteristic of each rotor, and the aerodynamic slope of the hybrid helicopter, as well as optionally the forward speed relative to air of the hybrid helicopter, into relation with one another.

The method of the invention then, on being applied, uses the flight conditions determined during the step of determining the flight conditions of the hybrid helicopter. These flight conditions include, in particular:

the speed relative to air of the hybrid helicopter as determined, for example, by means of a device provided with a Pitot tube, of an anemometer, or of any other suitable device; and the aerodynamic slope of the path followed by the hybrid helicopter as determined, for example, by means of an inertial unit or of any other suitable device.

The forward speed relative to air of the hybrid helicopter and the aerodynamic slope of its path are essential for determining the first value of the first characteristic and the second value of the second characteristic.

Furthermore, additional flight conditions may optionally be used to correct said first value of the first characteristic and said second value of the second characteristic relative to the flight conditions taken into consideration in the first and second databases.

For example, these additional flight conditions of the hybrid helicopter may include:
the current weight of the hybrid helicopter;
a temperature outside the hybrid helicopter; and
an atmospheric pressure outside the hybrid helicopter.

The current weight of the hybrid helicopter may be determined in known manner, e.g. by means of the calculator subtracting the weight of the fuel consumed since the hybrid helicopter took off from the actual weight of the hybrid helicopter at the time it took off. The current weight of the hybrid helicopter may also be determined in flight by a dedicated device.

The temperature and the atmospheric pressure outside the hybrid helicopter are measured, e.g. by means of suitable on-board sensors, e.g. a thermometer and a pressure sensor.

Then, the first value of the first characteristic of each propeller may be determined by the calculator using the first database. For example, the first value is determined as a function of the speed relative to air of the hybrid helicopter on a first curve corresponding to the current aerodynamic slope of the path of the hybrid helicopter.

When the first database includes optimized ranges, the first value may be determined within an optimized range close to its second limit if it is desired to give preference to keeping the BVI away, or else close to its first limit if it is desired to give preference to keeping away the interaction between the second blades and the vortex wake. To this end, levels of noise due to these interactions may be determined as a function of the flight phases. Then, the choice of the limit to approach is made as a function of these noise levels and of the noisier interaction depending on the current flight phase.

The first value of the first characteristic may also be determined in order to take into account the interactions between the vortex wake and the rear aerodynamic elements that the hybrid helicopter may have. In this situation, the calculator takes into account a compromise between the different possible interactions for determining the first value of the first characteristic.

Then, the second value of the second characteristic may be determined by the calculator using the second database and as a function of the previously determined first value of the first characteristic.

The first characteristic of each propeller may correspond directly to a flight control order associated with each propeller, e.g. a control order for controlling the pitch of the second blades of each propeller. The first characteristic of each propeller may also be a control order for controlling first thrust exerted by each propeller and contributing in part to the forward propulsion of the hybrid helicopter.

The second characteristic of each rotor may be the angle of incidence of the rotor disk of each rotor. This angle of incidence of the rotor disk is not associated directly with a flight control order, but may be controlled by means of two flight controls associated with each rotor, namely the cyclic pitch and collective pitch controls for each rotor. The second characteristic of each rotor may also be a control order for controlling second thrust exerted by each rotor and contributing in part to the forward propulsion of the hybrid helicopter.

Furthermore, the method of the invention is applied during a stabilized flight phase so that applying the first value of the first characteristic to each propeller and applying the second value of the second characteristic to each rotor does not hinder or does not disturb implementing a maneuver or a particular flight phase of the hybrid helicopter.

A stabilized flight phase is generally implemented with an aerodynamic slope of the path followed that is substantially constant. In such a situation, a stabilized flight phase may, in particular, include a horizontal flight on the level, i.e. with an aerodynamic slope that is substantially zero, an upward flight with a positive non-zero aerodynamic slope that is substantially constant, or a downward flight with a negative non-zero slope that is substantially constant.

In addition, a stabilized flight phase may be a load factor of the hybrid helicopter that is substantially constant, a speed relative to air that is substantially constant, a pitch angle and a roll angle that are substantially constant, and a vertical speed that is substantially constant. In addition, when the hybrid helicopter is on autopilot, a stabilized flight phase may be detecting that a pilot is not taking any action on a flight control of the hybrid helicopter.

The method of the invention for reducing noise for a hybrid helicopter may further have one or more of the following characteristics, taken individually or in combination.

In one aspect, the method of the invention for reducing noise may be engaged manually by an occupant of the hybrid helicopter, in particular by the pilot or copilot, by operating an engagement device. In this way, said occupant of the hybrid helicopter chooses whether they wish to engage a phase of reducing noise generated by the hybrid helicopter, and in particular generated by the vortex wake of the first blades of its rotor, in particular while they are coming in on a landing approach flight or indeed flying over an inhabited region, for example. For example, an engagement device comprises a button, a switch, or indeed a touch screen arranged on an instrument panel of the hybrid helicopter and transmitting a signal to the calculator, it being possible for this signal to be analog or digital, and electrical or optical, for example.

This method may also be engaged automatically, as a function of the position of the hybrid helicopter. The hybrid helicopter then continues the current flight phase while applying the method of the invention in order to reduce the noise generated by the hybrid helicopter, and in particular by the vortex wake of the first blades of its rotor.

For example, the method may be engaged automatically as soon as the hybrid helicopter approaches an urban region. Such proximity with an urban region may be detected by knowing the position of the hybrid helicopter within a terrestrial network, which position is determined, for example, by a Global Navigation Satellite System (GNSS) receiver, and from a third database including the positions of the various urban regions that might be overflown. Consequently, by using the coordinates of the hybrid helicopter and the third database, the calculator can determine that the hybrid helicopter is coming close to an urban region and that the method should then be engaged.

The method may also be engaged automatically as a function of the distance between the hybrid helicopter and the overflown ground, this distance being equal to a height measured parallel to a vertical direction, typically parallel to the direction of gravity. The method may, for example, be engaged automatically when the distance between the hybrid helicopter and the overflown ground is less than a height threshold, e.g. equal to 400 meters. Such a height may be characteristic, in particular, of implementation of an approach phase with a view to landing. For example, such a distance is determined by a radio altimeter, or a radar altimeter that the hybrid helicopter has.

The two preceding characteristics may also be combined and the two conditions mentioned may be validated in order to engage the method of the invention automatically.

The forward speed of the hybrid helicopter may also be a criterion to be taken into account for engaging the method of the invention. The interactions between the vortex wake generated by a rotating rotor and the blades of said rotor or of a propeller do not occur when the hybrid helicopter is hovering or indeed is flying at a low forward speed. Therefore, it may be unnecessary to apply the method of the invention when the hybrid helicopter is flying at a speed relative to air of less than a speed threshold. For example, the speed threshold is equal to 40 knots, i.e. 74.08 kilometers per hour.

In one aspect, the method of the invention may include an additional step of checking that the hybrid helicopter is in a stabilized flight phase. This checking step may be performed between the step of determining the flight conditions of the hybrid helicopter and the step of determining an optimized range in order to make sure that the hybrid helicopter is indeed in a stabilized flight phase and that the method of the invention can be applied. This checking step uses the flight phase characteristics determined previously during the step of determining the flight conditions of the hybrid helicopter and confirms, by means of the calculator, that the hybrid helicopter is indeed in a stabilized flight phase. The checking step may use one or more of the following parameters of the hybrid helicopter:

an aerodynamic slope that is substantially constant, regardless of whether said aerodynamic slope is zero, positive, or negative;
a load factor that is substantially constant;
a speed relative to air that is substantially constant;
a pitch angle and a roll angle that are substantially constant;
a vertical speed that is substantially constant; and
detection that no action is undertaken by a pilot on a flight control of the hybrid helicopter.

In one aspect, the method may include an additional step of inhibiting the method when the hybrid helicopter is no longer in a stabilized flight phase and is, for example, implementing a maneuver for changing its heading or path or indeed with a view to landing. This inhibition step is performed by means of the calculator and uses the flight conditions of the hybrid helicopter that are determined previously during the step of determining the flight conditions of the hybrid helicopter.

A non-stabilized flight phase is established whenever any one of the following conditions is satisfied:
the aerodynamic slope is not constant;
a load factor is not constant;
the speed relative to air is not constant;
the pitch angle or the roll angle is not constant;
the vertical speed is not constant; or
an action undertaken by a pilot on a flight control of the hybrid helicopter is detected.

When at least one of the preceding conditions is satisfied, the step of inhibiting the method may be performed and the method is frozen so as not to interfere with the piloting of the rotorcraft.

In one aspect, the step of implementing a stabilized flight phase of the hybrid helicopter may include one or more substeps.

For example, the step of implementing a stabilized flight phase may include the following substep for implementing the stabilized flight phase automatically:

automatically controlling each propeller using the first value of the first characteristic, and automatically controlling each rotor using the second value of the second characteristic by means of the automatic piloting device of the hybrid helicopter.

In this way, the automatic piloting device of the hybrid helicopter, e.g. an autopilot, uses the first value of the first characteristic of each propeller and the second value of the second characteristic of each rotor, thereby relieving the pilot of the task of managing the angle of incidence of each rotor for implementing the stabilized flight phase.

To this end, and in a first variant of the method of the invention, the automatic piloting device of the hybrid helicopter may use the first value of the first characteristic directly as the first setpoint to be complied with for each propeller and use the second value of the second characteristic directly as the second setpoint to be complied with for each rotor. The automatic piloting device then adjusts firstly the pitch control for controlling the pitch of the second blades of each propeller and secondly the cyclic and collective pitch controls for controlling the cyclic pitch and the collective pitch of the first blades of each rotor in order to comply with the respective ones of these setpoints during this step.

In a second variant, the automatic piloting device of the helicopter may use firstly a control order for controlling the pitch of the second blades as a first setpoint for each propeller and control orders for controlling the cyclic pitch and the collective pitch of the first blades as second setpoints to be complied with for each rotor.

In this situation, this automatic application step may then include the following substeps:

determining a first setpoint for controlling the pitch of the second blades of each propeller, the first setpoint being determined as a function of the first value of the first characteristic;

determining second setpoints for controlling the cyclic pitch and the collective pitch of the first blades of each rotor, said second setpoints being determined as a function of the second value of the second characteristic; and automatically controlling each propeller using the first setpoint for controlling the pitch of the second blades, and automatically controlling each rotor using the second setpoints for controlling the cyclic pitch and the collective pitch of the first blades by means of the automatic piloting device of the hybrid helicopter.

The first setpoint may be equal to the first value of the first characteristic when the first characteristic is a control order for controlling the pitch of the second blades of each propeller. When the first characteristic is not the pitch of the second blades of each propeller, the first setpoint may be associated with said first value of the first characteristic in the first database. Said first setpoint may also be determined by means of the calculator, as a function of the first value of the first characteristic and as a function of the flight conditions determined during the step of determining the flight conditions of the hybrid helicopter, in particular the atmospheric conditions, namely the temperature outside the hybrid helicopter and the atmospheric pressure in the vicinity of the hybrid helicopter.

The second setpoints include a second setpoint for controlling the cyclic pitch and a second setpoint for controlling the collective pitch of the first blades of each rotor, which second setpoints are determined by means of the calculator, as a function of the second value of the second characteristic and as a function of the flight conditions determined during the step of determining the flight conditions of the hybrid helicopter, in particular the atmospheric conditions, and optionally as a function of the second database.

When the second characteristic is the angle of incidence of each rotor, the second setpoint for controlling the cyclic pitch may be associated with said second value of the second characteristic in the second database. The second setpoint for controlling the cyclic pitch may also be determined by means of the calculator, as a function of the second value of the second characteristic and as a function of the flight conditions determined during the step of determining the flight conditions of the hybrid helicopter.

In both situations, the second setpoint for controlling the collective pitch is then determined by means of the calculator, as a function of the second setpoint for controlling the cyclic pitch, as a function of the second value of the second characteristic and as a function of the flight conditions determined during the step of determining the flight conditions of the hybrid helicopter in order to keep a lift force generated by each rotor substantially identical to the initial lift force exerted by each rotor before engaging the method. This initial lift force may be determined in known manner during the step of determining the flight conditions of the hybrid helicopter.

When the second characteristic is a control order for controlling the second thrust exerted by each rotor, the second setpoint for controlling the cyclic pitch and the second setpoint for controlling the collective pitch may be determined simultaneously by means of the calculator, as a function of the second value of the second characteristic, as a function of the initial aerodynamic force exerted by each rotor before engaging the method, and as a function of the flight conditions determined during the step of determining the flight conditions of the hybrid helicopter.

In this way, applying the second setpoints as determined to each rotor enables each rotor to provide the required second thrust and the required lift force. Similarly, applying the first setpoint as determined to each propeller enables each propeller to provide the required first thrust. Consequently, the hybrid helicopter implements the stabilized flight phase by complying with the second value of the second characteristic of each rotor and by complying with the first value of the first characteristic of each propeller, thereby advantageously limiting the occurrence of noise generated by the vortex wake generated by each first blade of each rotor.

Optionally, the pilot of the hybrid helicopter may at any time take back control of the controls of the hybrid helicopter so that the pilot can then control the flight of the hybrid helicopter.

In another example, the step of implementing the stabilized flight phase may include the following two substeps for a pilot of the hybrid helicopter implementing the stabilized flight phase manually:

determining a first setpoint for application to each propeller as a function of the first value of the first characteristic;

determining at least one second setpoint for application to each rotor as a function of the second value of the second characteristic; and displaying a first setpoint for application to each propeller and at least one second setpoint for application to each rotor on a display device.

In this situation, the pilot of the hybrid helicopter can see on the display device a first setpoint for application to each propeller and at least one second setpoint for application to each rotor. The pilot can then manually pilot the hybrid helicopter for a stabilized flight phase by applying said setpoints simultaneously and respectively to each propeller and to each rotor in order to limit the noise generated by the vortex wake generated by each first blade of each rotor.

The first setpoint may be equal to said first value of the first characteristic and said at least one second setpoint may comprise a single second setpoint equal to the second value of the second characteristic. In this situation, the pilot of the hybrid helicopter acts firstly on the pitch control of the second blades of each propeller in order to comply with the first setpoint and secondly on the cyclic pitch and collective pitch controls for each rotor in order to comply with the second setpoint and in order to keep a lift force generated by each rotor substantially identical to the initial lift force exerted by each rotor before engagement of the method.

The first setpoint may also be a control order for controlling the pitch of the second blades of each propeller, and said at least one second setpoint may comprise two second setpoints corresponding respectively to a control order for controlling the cyclic pitch of the first blades of each rotor and to a control order for controlling the collective pitch of the first blades of each rotor.

The first and second setpoints may then be determined, as for the above-described automatic application step, from the first database, from the second database, and/or as a function of the first value of the first characteristic, as a function of the second value of the second characteristic, and as a function of the flight conditions determined during the step of determining the flight conditions of the hybrid helicopter, in particular the atmospheric conditions.

Furthermore, a hybrid helicopter may include a single propeller or indeed at least two propellers arranged on either side of the fuselage of the hybrid helicopter. When the hybrid helicopter includes at least two propellers, said at least two propellers are suitable for performing the function of providing forward propulsion for the hybrid helicopter as well as the antitorque and yaw control functions. In this situation, the pitch of the second blades of each propeller may be broken down into a mean pitch component and a differential pitch component. The pitch of the second blades of a first propeller may then be equal to the sum of the mean pitch component plus the differential pitch component. Similarly, the pitch of the second blades of a second propeller may be equal to the difference of the mean pitch component minus the differential pitch component. Furthermore, the mean pitch component may be equal to the half-sum of the pitches of the two propellers, while the differential pitch component may be equal to the half-difference of the pitches of the two propellers.

Consequently, when the hybrid helicopter includes at least two propellers, the pitch of the second blades of each above-mentioned propeller is equal to the mean pitch of the second blades of said propeller. Conversely, when the hybrid helicopter includes a single propeller, the pitch of the second blades of the above-mentioned single propeller is equal to the total pitch of the second blades of said propeller.

In one aspect, the hybrid helicopter may include at least one stabilizer, e.g. a horizontal stabilizer, provided with at least one movable segment that enables the longitudinal balance of the hybrid helicopter to be controlled, and the method of the invention may include an additional step of controlling an angular position of said at least one movable segment so as to control the angle of incidence of the fuselage. An actuator makes it possible to move each movable segment. A stabilizer may be formed entirely by a movable segment and, de facto, be totally angularly positionable by the actuator.

Such a stabilizer, e.g. a substantially horizontal stabilizer, enables the angle of incidence of the fuselage to be modified and, de facto, enables the fuselage and where applicable the wings and the respective propellers that are secured to the fuselage and/or to the wings to be tilted. Consequently, each propeller may be angularly positioned relative to the forward direction of the hybrid helicopter, and preferably parallel to said forward direction, firstly so that the thrust exerted by each propeller is as parallel as possible to said forward direction so as to contribute solely to providing forward propulsion for the hybrid helicopter, and secondly so that the forces on the mast of each propeller are minimized.

Similarly this angle of incidence of the fuselage may also enable the mast of each rotor to be tilted so as also to minimize the forces to which said mast is subjected, by angularly positioning the fuselage substantially parallel to the rotor disk.

In addition, so that any wings exert a lift force that is sufficient to keep the hybrid helicopter in stabilized flight, movable segments, e.g. of the flap type, of each wing are angularly positioned in suitable manner.

One of the two conditions may be preferred as a function of the angle of incidence of each rotor or indeed a compromise between these two conditions may be preferred by the calculator or indeed by the pilot of the hybrid helicopter.

The presence of such a stabilizer advantageously enables the behavior and the balance of the hybrid helicopter to be improved.

In one aspect, the method of the invention may include an additional step of reducing a speed of rotation of said at least one rotor, in order to reduce further the noise generated by the first blades of each rotor. Indeed, the method makes it possible to direct the vortex wake generated by each first blade of each rotor so that said wake avoids as far as possible the other first blades of the rotor and the second blades of the propellers in order to limit noise generation. Advantageously, the reduction in the speed of rotation of each rotor firstly enables the intensity of each vortex wake to be limited, and, de facto, the intensity of any noise caused by each vortex wake to be limited, and secondly enables occurrence of aerodynamic noise specific to the first blades of each rotor and generated while they are rotating to be limited.

The present invention also provides a hybrid helicopter including:
  a fuselage;
  at least one rotor provided with a plurality of first blades and providing the hybrid helicopter with at least part of its lift and/or forward propulsion;
  at least one propeller provided with a plurality of second blades and providing the hybrid helicopter with at least part of its forward propulsion;
  an automatic piloting device;
  at least one sensor determining flight conditions of said hybrid helicopter; and
  at least one calculator.

The calculator is configured to implement the method of reducing in-flight noise for an above-described hybrid helicopter. Said at least one sensor is designed to measure or to determine flight conditions of the hybrid helicopter.

The hybrid helicopter may also include at least two wings arranged on either side of the fuselage and providing the hybrid helicopter with at least part of its lift, and at least one display device.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

A hybrid helicopter 10 generally includes a fuselage 11, at least one rotor 12 provided with a plurality of first blades 121, at least one propeller 13 provided with a plurality of second blades 131, and a tail boom 16. Each rotor 12 provides the hybrid helicopter 10 with at least part of its lift and/or forward propulsion, and each propeller 13 provides the hybrid helicopter 10 with at least part of its forward propulsion.

Figure 1:
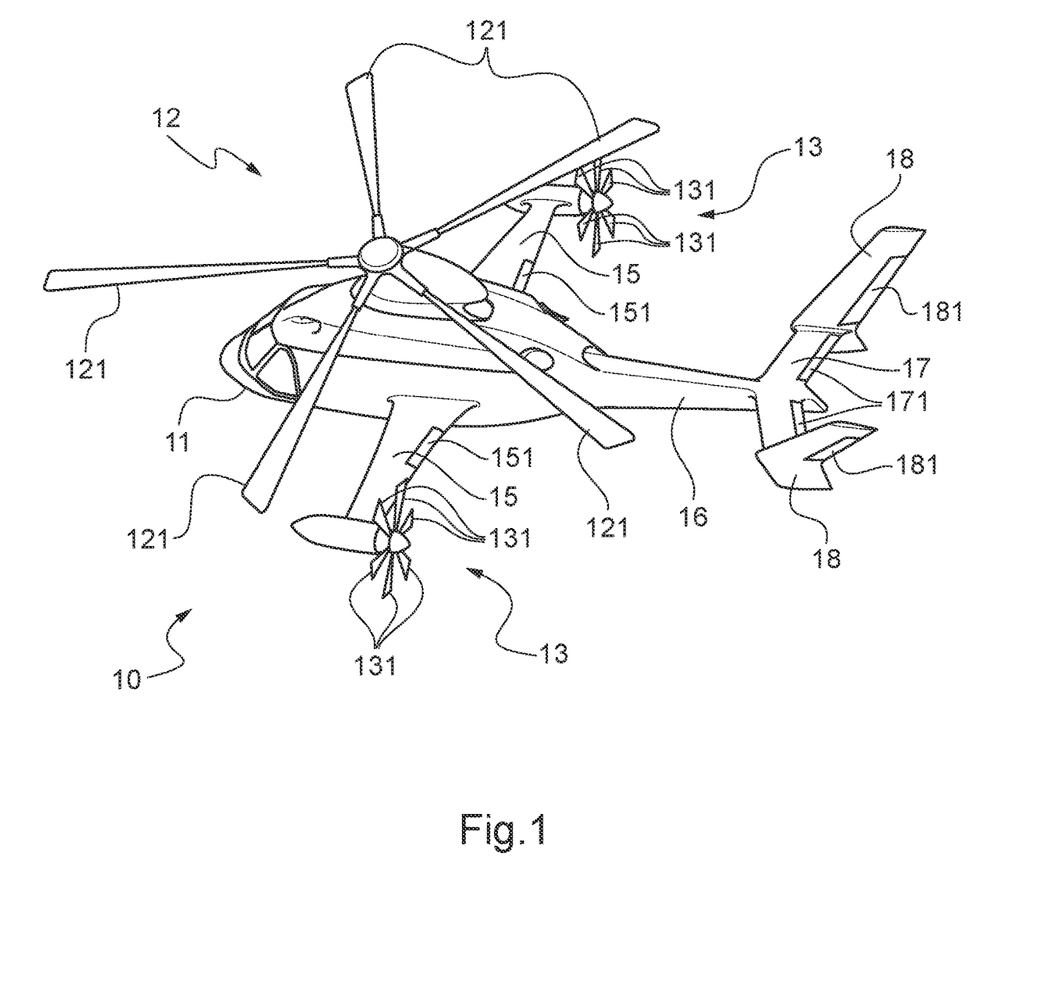
FIG. 1 shows a hybrid helicopter.

More precisely, the hybrid helicopter 10 shown in FIG. 1 includes a fuselage 11, a rotor 12, two propellers 13, a tail boom 16, as well as two wings 15 that provide the hybrid helicopter 10 with at least part of its lift when it is flying forwards, and three stabilizers 17, 18 carried by the tail boom 16, namely one horizontal stabilizer 17 and two vertical stabilizers 18. In addition, each wing 15 includes a movable segment 151 that can be moved to modify the lift force generated by each wing 15. Similarly, the horizontal stabilizer 17 includes two movable segments 171 and each vertical stabilizer 18 includes a movable segment 181 that is angularly positionable to modify the aerodynamic force generated by the respective one of the stabilizers 17, 18.

Figure 2:
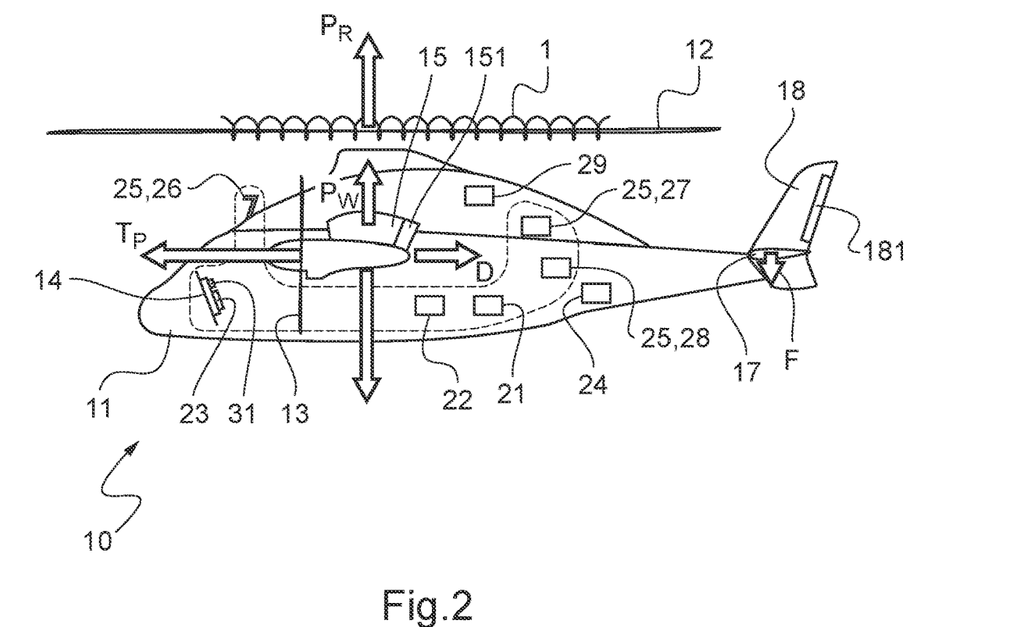
FIGS. 2 to 4 are three diagrams showing a hybrid helicopter.

As shown in FIG. 2, the hybrid helicopter 10 also includes an automatic piloting device 21 for automatically piloting the hybrid helicopter 10, e.g. an autopilot, a calculator 22, a plurality of sensors 25 and a display device 23. For example, the display device 23 is arranged on an instrument panel 14 of the hybrid helicopter 10. However, any other display device may be used in the context of the invention, such as a head-up device for example.

The sensors 25 are designed to measure or to determine flight conditions of the hybrid helicopter 10. For example, the sensors 25 include a device 26 provided with a Pitot tube making it possible to measure the speed relative to air of the hybrid helicopter 10. For example, the sensors 25 include an inertial unit 28 enabling the aerodynamic slope of the path followed by the hybrid helicopter 10 to be determined. For example, the sensors 25 include at least one device 27 dedicated to measuring atmospheric conditions, namely an outside temperature and an outside atmospheric pressure outside the hybrid helicopter 10.

For example, the hybrid helicopter 10 also includes a Global Navigation Satellite System (GNSS) receiver 24 delivering the position of the hybrid helicopter 10 within a terrestrial frame of reference, as well as a radio altimeter 29 delivering a height measured substantially vertically between the hybrid helicopter 10 and the overflown ground or water.

The hybrid helicopter 10 shown in FIG. 2 is in a cruising flight situation in which it is cruising horizontally on the level with a zero aerodynamic slope. The propellers 13 provide the first thrust $T_P$ necessary for propelling the hybrid helicopter 10 forwards while the lift force necessary for providing it with lift is provided jointly by the wings 15 that provide first lift $P_W$ and by the rotor 12 that provides second lift $P_R$. The rotor 12 has a zero angle of incidence and the aerodynamic force it generates is, in full, to be used for providing lift for the hybrid helicopter 10. The horizontal stabilizer 17 exerts an aerodynamic force F that is oriented towards the pitch and that enables the hybrid helicopter 10 to be balanced so that the fuselage 11 has a substantially zero angle of incidence.

In this configuration and in particular as a result of the zero angle of incidence of the rotor 12 and of flying with a zero aerodynamic slope, the vortex wake 1 generated by each of the rotating first blades 121 propagates substantially horizontally as shown in FIG. 2 so that the other first blades 121 of the rotor 12 can strike each vortex wake 1, causing noise to occur that can constitute a nuisance for any populations that might be overflown.

Figure 3:
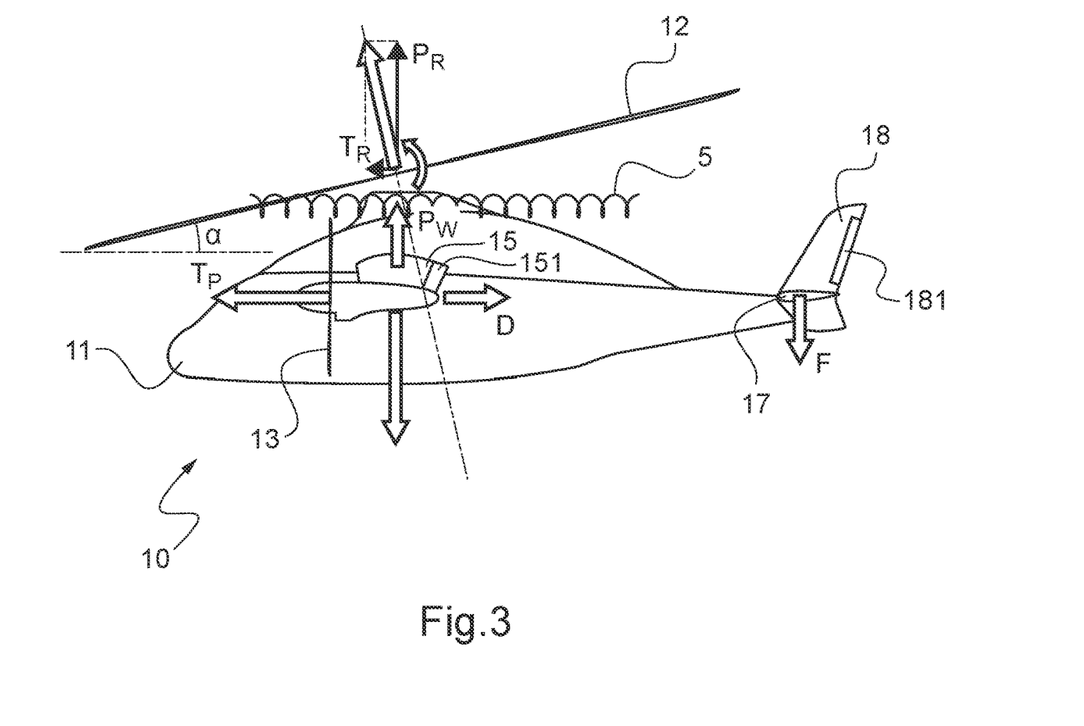

The hybrid helicopter 10 shown in FIG. 3 is in the same cruising flight situation in which it is cruising horizontally on the level with a zero aerodynamic slope as the hybrid helicopter 10 shown in FIG. 2. However, the distribution of the aerodynamic forces generated by the propellers 13, the rotor 12, the wings 15, and the horizontal stabilizer 17 is different following application of the method of invention.

Indeed, the rotor 12 has a non-zero angle of incidence α. As a result, the aerodynamic force generated by the rotor 12 resolves into second lift $P_R$ and into second thrust $T_R$. This second lift $P_R$ is added to the first lift $P_W$ generated by the wings 12 so as to provide lift for the hybrid helicopter 10. In order for this second lift $P_R$ to be equal to the second lift shown in FIG. 2, the aerodynamic force generated by the rotor 12 is increased compared with FIG. 2, as a function of the angle of incidence α of the rotor 12. Similarly, in this situation, the second thrust $T_R$ generated by the rotor 12 is added to the first thrust $T_P$ generated by each propeller 13 in order to provide the hybrid helicopter 10 with its forward propulsion.

Furthermore, the aerodynamic force F exerted by the horizontal stabilizer 17 is increased compared with FIG. 2 in order to oppose the torque induced by the non-zero angle of incidence of the rotor so as to keep the balance of the hybrid helicopter 10 and the substantially zero angle of incidence of the fuselage 11.

Consequently, the aerodynamic drag force D, generated in particular by the fuselage 11, the rotor 12 and the stabilizers 17, 18 may be increased compared with FIG. 2. However, the first thrust $T_P$ in this configuration of FIG. 3 may be reduced compared with FIG. 2 in order to achieve the cruising flight and the balance of the hybrid helicopter 10.

In this situation and in particular as a result of flying with a zero aerodynamic slope and in spite of the non-zero angle of incidence α of the rotor 12, the vortex wake 5 generated by each of the rotating first blades 121 propagates substantially horizontally as shown in FIG. 3 without coming into contact with the other first blades 121 of the rotor 12, as shown in FIG. 3 and therefore advantageously does not cause noise to occur that can constitute a nuisance for the population on the ground.

This configuration is obtained by implementing the method of the invention for reducing in-flight noise from a hybrid helicopter 10 by means of the calculator 22. The calculator 22 includes a memory that can store instructions that, in particular, enable the method of reducing in-flight noise to be performed. The calculator 22, formed, for example, by a processor or indeed by a programmable system or any other suitable device, enables the steps of this method of reducing in-flight noise to be performed.

Figure 4:
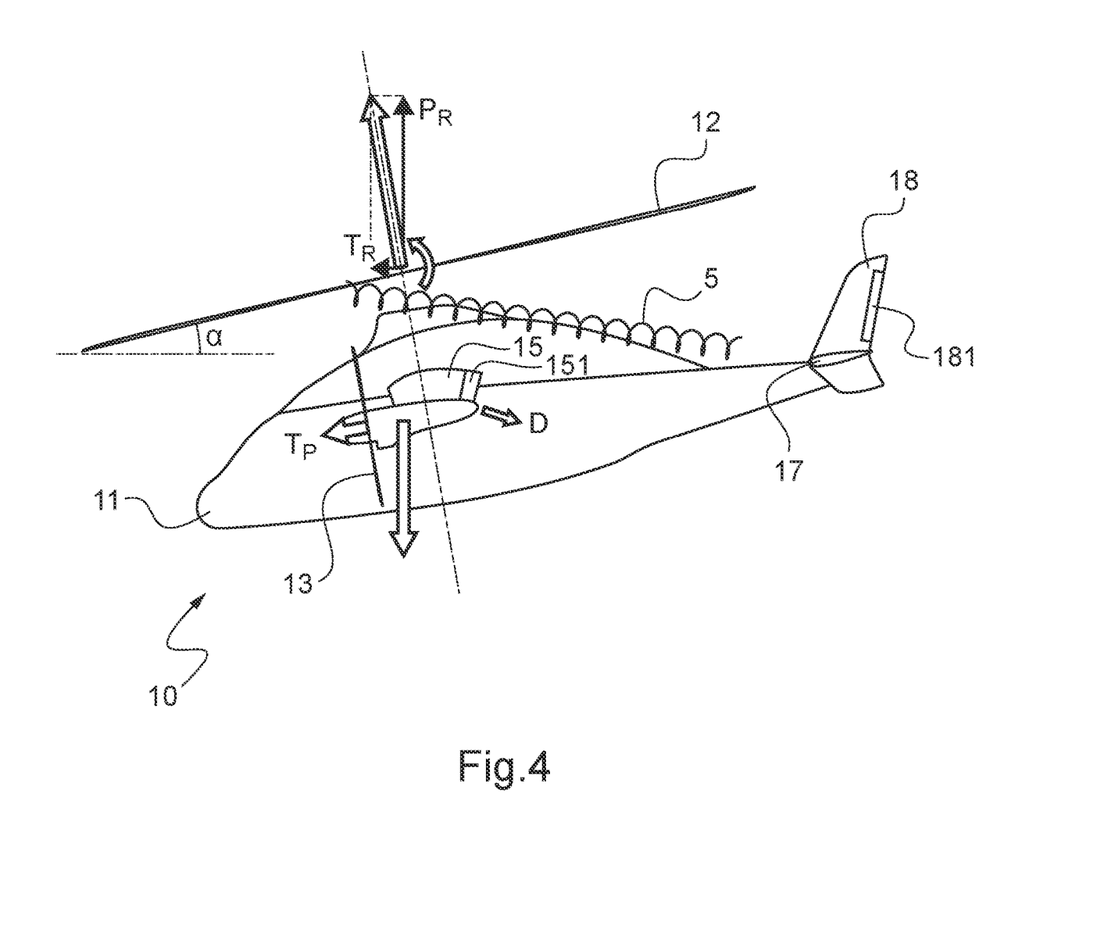

The hybrid helicopter 10 shown in FIG. 4 is in a takeoff phase with a non-zero aerodynamic slope and an upward path. The rotor 12 has a non-zero angle of incidence as does the fuselage 11. As a result, the aerodynamic force generated by the rotor 12 resolves into second lift $P_R$ and into second thrust $T_R$. In this situation, the second thrust $T_R$ generated by the rotor 12 may be added to first thrust $T_P$ generated by each propeller 13 in order to provide forward propulsion for the hybrid helicopter 10. However, the forward propulsion of the hybrid helicopter 10 may be provided solely by the rotor 12, the first thrust $T_P$ generated by each propeller 13 then being zero.

In addition, the forward speed of the hybrid helicopter 10 is low and therefore the first lift $P_W$ generated by the wings 15 and the aerodynamic force F exerted by the horizontal stabilizer 17 are substantially zero. In this situation, the second lift $P_R$ provides lift for the hybrid helicopter 10 firstly by opposing the apparent weight of the hybrid helicopter 10 and secondly by enabling the hybrid helicopter 10 to climb.

Finally, due to the low forward speed of the hybrid helicopter 10, the aerodynamic drag force D, generated, in particular, by the fuselage 11, by the rotor 12, and by the stabilizers 17, 18 is low.

In this situation and in particular as a result of the non-zero angle of incidence of the rotor 12 and of the upward path of the hybrid helicopter 10, the vortex wake 5 generated by each of the rotating first blades 121 propagates rearwards and downwards, while being directed between the first blades 121 of each rotor 12 and the second blades 131 of each propeller 13. Consequently, the vortex wake 5 advantageously propagates without coming into contact with the other first blades 121 of said rotor 12 or with the second blades 131 of each propeller 13, and thus advantageously does not cause any occurrence of noise that might be a nuisance for the population on the ground.

This configuration is also obtained by implementing the method of the invention for reducing in-flight noise from a hybrid helicopter 10 by means of the calculator 22.

This method of reducing noise may be engaged manually by a pilot of the hybrid helicopter 10 by means of the pilot operating an engagement device 31 that transmits an order to the calculator 22, said order being carried by a signal, e.g. an analog or digital and electrical or optical signal. This method may also be engaged automatically as a function of the position of the hybrid helicopter 10 within a terrestrial frame of reference, e.g. when it is overflying an inhabited region, and/or as a function of the distance between the hybrid helicopter 10 and the overflown ground.

Firstly, a step of determining the flight conditions of the hybrid helicopter 10 is performed by means of the sensors 25. During this step of determining the flight conditions of the hybrid helicopter 10, the speed relative to air of the hybrid helicopter 10 and the aerodynamic slope of its path are, in particular, determined. The temperature outside the hybrid helicopter 10 and the atmospheric pressure may also be measured during this step. Similarly, in known manner, the current weight of the hybrid helicopter 10 may be determined in flight, e.g. by means of a dedicated device or indeed via the calculator 22.

Then, a step of determining a first value of a first characteristic of each propeller 13 is performed by means of a first database and as a function of the flight conditions.

The first database is determined previously, e.g. during a preliminary step of establishing the first database. For example, this first database is established by computations and by digital simulations by involving a flight mechanics model that defines the balances of the hybrid helicopter 10, and that is then optionally validated by trials.

Figure 5:
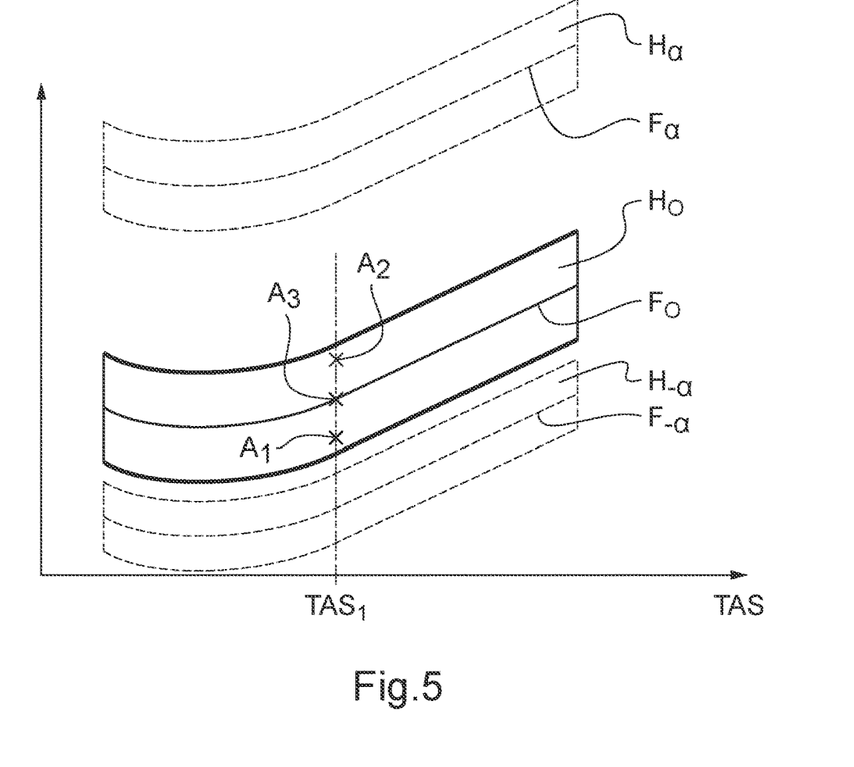
FIG. 5 is a graph showing an optimized range relating to a first characteristic of each propeller.

The first database may include an array of optimized ranges or else an array of first optimized curves corresponding to first values of the first characteristic enabling the interactions of the vortex wake generated by the rotor 12 to be limited to a minimum. The graph in FIG. 5 shows an optimized range and an optimized curve within a frame of reference that plots the speed relative to air of the hybrid helicopter or "True Air Speed" ("TAS") along its abscissa axis, and the first characteristic of each propeller 13 up its ordinate axis.

The first optimized curve associates a first value of the first characteristic of each propeller 13 with a speed relative to air of the hybrid helicopter 10, while the optimized range associates a plurality of first values of the first characteristic with a speed relative to air of the hybrid helicopter 10.

The first optimized curve defines the pairs of first values of the first characteristic and of speeds relative to air of the hybrid helicopter 10 optimizing the noise reduction using a predefined compromise between the BVIs and the interactions between the vortex wake and the second blades 131. The optimized range defines a plurality of first values of the first characteristic for a speed relative to air of the hybrid helicopter 10. These first values of the first characteristic cover an interval between an upper limit for the optimized range that corresponds to first maximum values above which a BVI takes place and a lower limit for the optimized range that corresponds to minimum first values below which an interaction takes place between the second blades 131 and the vortex wake.

Furthermore, each optimized range and each optimized curve are defined for a given aerodynamic slope of the path of the hybrid helicopter 10. For a different aerodynamic slope, another optimized range and another optimized curve need to be taken into account for determining the first value of the first characteristic.

For example, the optimized curve $F_0$ and the optimized range $H_0$ shown in FIG. 5 are defined for a given aerodynamic slope, e.g. a zero aerodynamic slope. In this situation, for an aerodynamic slope that is different from the given aerodynamic slope, the optimized curve and the optimized range are obtained by respectively moving the optimized curve $F_0$ and the optimized range $H_0$ in vertical translation, parallel to the ordinate axis. For example, said optimized curve $F_0$ and said optimized range $H_0$ may be shifted upwards, i.e. towards the upper first values of the first characteristic, so as to form an optimized curve $F_\alpha$ and an optimized range $H_\alpha$ that are associated with a positive aerodynamic slope $\alpha$ corresponding to an upward flight or downwards, i.e. towards the lower first values of the first characteristic, so as to form an optimized curve $F_{-\alpha}$ and an optimized range $H_{-\alpha}$ that are associated with a negative aerodynamic slope $-\alpha$ corresponding to a downward flight.

In addition, an optimized curve and an optimized range may be corrected as a function of the current weight of the hybrid helicopter 10 or indeed as a function of the atmospheric conditions and the deviations from the values of the weight of the hybrid helicopter 10 or else as a function of the atmospheric conditions present when the first database was established.

For example, the first characteristic of a propeller 13 may be a pitch control order for controlling the pitch of its second blades 131 or indeed a control order for controlling first thrust exerted by said propeller 13 and contributing in part to providing forward propulsion for the hybrid helicopter 10.

The hybrid helicopter 10 shown in FIG. 1 includes two propellers 13 that are suitable for performing firstly the function of propelling the hybrid helicopter 10 forwards and secondly the antitorque and yaw control functions for the hybrid helicopter 10. The pitch of the second blades 131 of each propeller 13 can then be broken down into a mean pitch component relating to the forward propulsion of the hybrid helicopter 10 and a differential pitch component relating to the antitorque and yaw control functions for the hybrid helicopter 10.

In this situation, the pitch of the second blades 131 that is mentioned below is equal to this mean pitch.

During this step of determining a first value of the first characteristic of each propeller 13, the first value of the first characteristic of each propeller 13 is thus determined using the first database, in particular as a function of the speed relative to air of the hybrid helicopter 10 and of the aerodynamic slope as indicated in the first database. This first value of the first characteristic is thus determined in order to limit, or indeed to avoid interactions between the vortex wake and the first blades 121 and/or the second blades 131.

For example, if the first database includes optimized ranges and if it is desired for the vortex wake to be as far away as possible from the first blades 121, a first value A1 of the first characteristic is determined as close as possible to the lower limit of the optimized range for the current speed relative to air $TAS_1$ of the hybrid helicopter 10. Conversely, if it is desired for the vortex wake to be as far away as possible from the second blades 131, the first value A2 of the first characteristic is determined to be as close as possible to the upper limit of the optimized range. In order for the vortex wake to be equidistant from the first blades 121 and from the second blades 131, so as to limit to as low as possible the noisy interactions between firstly the vortex wake generated by each of the rotating first blades 121 and secondly the other first blades 121 and the other second blades 131 of each propeller 13, the first value A3 of the first characteristic is chosen to be substantially in the middle of the optimized range. The value A3 is also situated on an optimized curve $F_0$ that the first database could contain.

Then, a step of determining a second value of a second characteristic of the rotor 12 is performed by means of a second database. The second value of the second characteristic is chosen as a function of the previously determined first value of the first characteristic of each propeller 13 and as a function of the aerodynamic slope. Indeed, following any simulations performed during the preliminary step, the second database associates a first value of the first characteristic with a second value of the second characteristic of the rotor 12 for a current aerodynamic slope of the path of the hybrid helicopter 10. This pair of the first value of the first characteristic and of the second value of the second characteristic advantageously enables generation of noise due to interactions between firstly the vortex wake caused by each rotating first blade 121 of the rotor and secondly the other blades 121, 131 of the rotor 12 and of each propeller 13 to be limited or indeed avoided.

The second characteristic of the rotor 12 may, for example, be an angle of incidence of the rotor disk or else be a control order for controlling second thrust exerted by the rotor 12 and contributing in part to providing forward propulsion for the hybrid helicopter 10.

The second database may include an array of second curves, a numerical simulation algorithm or indeed one or more equations determined by simulation and then readjusted during in-flight trials. These second curves put the following into relation with one another: the first characteristic of each propeller 13, the second characteristic of the rotor 12, and the aerodynamic slope of the path of the hybrid helicopter 10, as well as optionally the speed relative to air of the hybrid helicopter 10.

Figure 6:
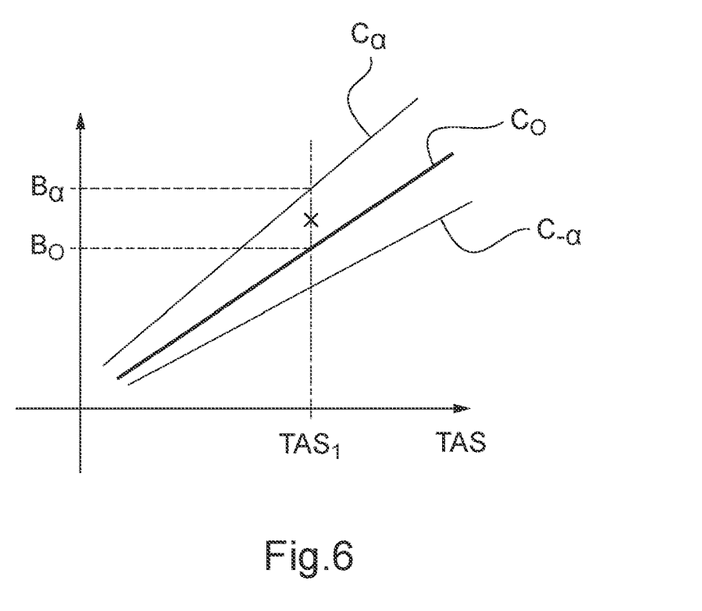
FIG. 6 is a graph showing a curve of the pitch of the second blades of a propeller.

For example, when the second characteristic is the angle of incidence of the rotor disk, the second database may include an array of second curves, each second curve corresponding to a distinct value of the angle of incidence of the rotor disk, and the second database provides the pitch of the second blades 131 of a propeller 13 as a function of the forward speed relative to air of the hybrid helicopter 10. Such arrays of second curves exist for the stabilized phases of flight on the level, upwards, and downwards. A second curve $C_0$ is shown in FIG. 6 for a level flight with the rotor disk having a zero angle of incidence. If the first value $B_0$ of the first characteristic that is determined previously for the current forward speed relative to air of the hybrid helicopter 10 is situated on said second curve, then the second value of the second characteristic, namely the angle of incidence of the rotor disk, is equal to zero. Conversely, if the first value of the first characteristic is not on said second curve, then the second value of the second characteristic is not zero.

During simulations and in-flight trials, other second curves $C_\alpha$, $C_{-\alpha}$ have been constructed that correspond to the non-zero angles of incidence of the rotor disk. In this situation, if the first value $B_\alpha$ of the first characteristic is on a second curve $C_\alpha$, then the second curve of the second characteristic is equal to the angle of incidence α that corresponds to the second curve $C_\alpha$ on which the first value is situated. If a first value of the first characteristic is not on any second curve $C_\alpha$ and is situated between two second curves, then the second value of the second characteristic is determined by interpolation.

These various second curves providing the pitch of the second blades 131 of a propeller 13 as a function of the forward speed relative to air TAS of the hybrid helicopter 10, for the stabilized phases of flight on the level, upwards, and downwards, and with different values for angles of incidence of the rotor 12, are stored in the second database.

Finally, a step of implementing a stabilized flight phase of the hybrid helicopter 10 is performed by applying the first value of the first characteristic to the two propellers 13 and the second value of the determined second characteristic to the rotor 12.

This step of implementing the stabilized flight phase may be automatic and it then includes a substep of automatically controlling the two propellers 13 using the first value of the first characteristic and of automatically controlling the rotor 12 using the second value of the second characteristic by means of the automatic piloting device 21 of the hybrid helicopter 10.

This automatic application substep may use the first value of the first characteristic as a first setpoint for each propeller 13, and the second value of the second characteristic as the second setpoint for the rotor 12.

This automatic application substep may also use a first setpoint for controlling the pitch of the second blades 131 as a first setpoint for each propeller 13. This automatic application substep may also use a second setpoint of cyclic pitch for controlling the cyclic pitch of the first blades 121 and a second setpoint of collective pitch for controlling the collective pitch of the first blades 121 as second setpoints for the rotor 12.

This automatic application step then includes the following substeps:

a substep of determining a first setpoint for controlling the pitch of the second blades 131 of each propeller 13, the first setpoint being determined as a function of the first value of the first characteristic;

a substep of determining second setpoints for controlling the cyclic pitch and the collective pitch of the first blades 121 of the rotor 12, said second setpoints being determined as a function of the second value of the second characteristic; and a substep of automatically controlling the two propellers 13 using the first setpoint for the pitch of the second blades 131 and of automatically controlling the rotor 12 using the second setpoints for the cyclic pitch and for the collective pitch of the first blades 121 by means of the automatic piloting device 21.

The first setpoint may be associated with the first value of the first characteristic in the first database or else be determined by means of the calculator 22, as a function of the first value of the first characteristic, or indeed as a function of the flight conditions of the hybrid helicopter 10, in particular the atmospheric conditions, e.g. via a control algorithm.

The second setpoints may be determined by means of the calculator 22, as a function of the second value of the second characteristic and as a function of the flight conditions determined during the step of determining the flight conditions of the hybrid helicopter 10, in particular the atmospheric conditions, and optionally as a function of the second database, e.g. via a control algorithm.

For example, the first setpoint may be equal to a control order for controlling the pitch of the second blades 131 of each propeller 13, and said at least one second setpoint may include two second setpoints equal respectively to a control order for controlling the cyclic pitch of the first blades 121 of the rotor 12 and to a control order for controlling the collective pitch of the first blades 121 of the rotor 12.

The step of implementing the stabilized flight phase may also be manual and, in that capacity, include the following substeps:

a substep of determining a first setpoint for application to the two propellers 13 as a function of the first value of the first characteristic;

a substep of determining at least one second setpoint for application to said at least one main rotor 12 as a function of said second value of said second characteristic; and a substep of displaying said first setpoint and said at least one second setpoint on the display device 23.

In this way, the pilot sees displayed on the display device 23 the setpoints to be applied respectively to the two propellers 13 and to the rotor 12. The pilot can then pilot the hybrid helicopter 10 manually, during a substep of manually piloting the hybrid helicopter 10, by applying said setpoints in order to limit the noise generated by the vortex wake generated by each first blade 121 of the rotor 12.

In the same way as in automatically implementing the stabilized flight phase, the first setpoint may be equal to the first value of the first characteristic and said at least one second setpoint may be equal to the second value of the second characteristic.

The first setpoint may also be equal to a control order for controlling the pitch of the second blades 131 of each propeller 13, and said at least one second setpoint may include two second setpoints equal respectively to a control order for controlling the cyclic pitch of the first blades 121 of the rotor 12 and to a control order for controlling the collective pitch of the first blades 121 of the rotor 12.

For example, these first and second setpoints may be determined by applying the same substeps as for the above-described automatic application step.

The first and second setpoints may then be determined, as above, from the first database, from the second database, and/or as a function of the first value of the first characteristic, as a function of the second value of the second characteristic, and as a function of the flight conditions.

Furthermore, the method may include an additional step of inhibiting the method when the flight phase of the hybrid helicopter 10 is no longer stabilized. For example, the hybrid helicopter 10 is no longer in a stabilized flight phase during maneuvering. A non-stabilized flight phase is established by the calculator 22 whenever any one of the following conditions is satisfied:

the aerodynamic slope of the hybrid helicopter 10 is not constant;

a load factor of the hybrid helicopter 10 is not constant;

the speed relative to air of the hybrid helicopter 10 is not constant;

a pitch angle or a roll angle of the hybrid helicopter 10 is not constant;

a vertical speed of the hybrid helicopter 10 is not constant; or an action undertaken by a pilot on a flight control of the hybrid helicopter 10 is detected.

The hybrid helicopter 10 includes an angularly positionable horizontal stabilizer 17 provided with movable segments 171, the method may include an additional step of controlling an angular position of the horizontal stabilizer 17 so as to control an angle of incidence of the fuselage 11. Consequently, the fuselage 11 may be inclined without the angle of incidence of the rotor disk being modified for the purpose, for example, of directing the thrust from the propellers 13 parallel to the forward direction of the hybrid helicopter 10 in order to minimize the forces on the mast of each propeller 13.

Finally, the method may include an additional step of reducing a speed of rotation NR of the rotor 12. This reduction in the speed of rotation NR of the rotor 12 may also contribute to reducing the noise generated by the first blades 121 of the rotor 12, by reducing, in particular, the intensity of each vortex wake generated by each first blade 121.

Naturally, the present invention may be subjected to numerous variations as to its implementation. Although several implementations are described above, it should readily be understood that it is not conceivable to identify exhaustively all possible implementations. It is naturally possible to replace any of the means described with equivalent means without going beyond the ambit of the present invention.

What is claimed is:

1. A method of reducing in-flight noise for a hybrid helicopter,
wherein the method comprises the following steps:
determining flight conditions of the hybrid helicopter;
wherein the hybrid helicopter includes:
at least one main rotor provided with a plurality of blades and providing the hybrid helicopter with at least part of its lift and/or forward propulsion;
at least one propeller provided with a plurality of blades and providing the hybrid helicopter with at least part of its forward propulsion;
an automatic piloting device; and
at least one calculator;
wherein flight conditions of the hybrid helicopter are determined using at least one sensor of the hybrid helicopter, the flight conditions including a speed relative to air of the hybrid helicopter and an aerodynamic slope of a path followed by the hybrid helicopter;
determining a value of a thrust to be exerted by the propeller(s) using a first database and as a function of the flight conditions;
determining a value of an angle of incidence to be had by the main rotor(s) using a second database and as a function of the value of the thrust to be exerted by the propeller(s) so as to limit noise generation due to a vortex wake caused by each rotating blade of the main rotor(s); and
implementing a stabilized flight phase of the hybrid helicopter by controlling the propeller(s) to exert a thrust commensurate with the value of the thrust to be exerted by the propeller(s) and by controlling the main rotor(s) to have an angle of incidence commensurate with the value of the angle of incidence to be had by the main rotor(s).

2. The method according to claim 1,
wherein the method of reducing noise is engaged:
either by operating an engagement device, the engagement device transmitting a signal to the calculator;
or automatically as a function of the position of the hybrid helicopter within a terrestrial frame of reference and/or as a function of the distance between the hybrid helicopter and the overflown ground.

3. The method according to claim 1,
wherein the step of implementing the stabilized flight phase includes the following substep:
automatically controlling the propeller(s) using the value of the thrust to be exerted by the propeller(s), and automatically controlling the main rotor(s) using the value of the angle of incidence to be had by the main rotor(s) by means of the automatic piloting device of the hybrid helicopter.

4. The method according to claim 3,
wherein the step of automatically controlling includes the following substeps:
determining a first setpoint for controlling the pitch of the blades of the propeller(s), the first setpoint being determined as a function of the value of the thrust to be exerted by the propeller(s);
determining second setpoints for controlling the cyclic pitch and the collective pitch of the blades of the main rotor(s), the second setpoints being determined as a function of the value of the angle of incidence to be had by the main rotor(s); and
automatically controlling the propeller(s) using the first setpoint for controlling the pitch of the blades of the propeller(s), and automatically controlling the main rotor(s) using the second setpoints for controlling the cyclic pitch and the collective pitch of the blades of the main rotor(s) by means of the automatic piloting device.

5. The method according to claim 1,
wherein the step of implementing the stabilized flight phase includes the following substeps:
determining a first setpoint for application to the propeller(s) as a function of the value of the thrust to be exerted by the propeller(s);
determining at least one second setpoint for application to the main rotor(s) as a function of the value of the angle of incidence to be had by the main rotor(s); and
displaying the first setpoint and the second setpoint(s) on a display device of the hybrid helicopter.

6. The method according to claim 5,
wherein the first setpoint is equal to the value of the first thrust to be exerted by the propeller(s) and the second setpoint(s) is/are equal to the value of the angle of incidence to be had by the main rotor(s).

7. The method according to claim 5,
wherein the first setpoint comprises a control order for controlling the pitch of the blades of the propeller(s) and the second setpoint(s) comprise(s) a control order for controlling the cyclic pitch of the blades of the main rotor(s) and a control order for controlling the collective pitch of the blades of the main rotor(s).

8. The method according to claim 1,
wherein the stabilized flight phase comprises a horizontal flight on the level with zero slope, an upward flight with a positive non-zero aerodynamic slope, or a downward flight with a negative non-zero aerodynamic slope.

9. The method according to claim 1,
wherein the flight conditions also include a current weight of the hybrid helicopter, an outside temperature outside the hybrid helicopter and/or an outside atmospheric pressure.

10. The method according to claim 1,
wherein the method includes a preliminary step of establishing databases, the databases including firstly the first database enabling values of a thrust to be exerted by the propeller(s) to be determined as a function of values of the speed relative to air of the hybrid helicopter and as a function of values of the aerodynamic slope, and secondly the second database enabling values of the angle of incidence to be had by the main rotor(s) to be determined as a function of the values of the thrust to be exerted by the propeller(s).

11. The method according to claim 10,
wherein the first database includes:
either an array of first optimized curves putting the thrust to be exerted by the propeller(s) and the speed relative to air of the hybrid helicopter into relation with one another, each first optimized curve corresponding to the aerodynamic slope;
or an array of first optimized ranges, each optimized range putting the thrust to be exerted by the propeller(s) and the speed relative to air of the hybrid helicopter into relation with one another, each first optimized range corresponding to the aerodynamic slope;
or a numerical simulation algorithm or one or more equations putting the thrust to be exerted by the propeller(s), the speed relative to air of the hybrid helicopter and the aerodynamic slope into relation with one another;
and the second database includes:
either an array of second curves, each second curve putting the thrust to be exerted by the propeller(s) and the angle of incidence to be had by the main rotor(s) into relation with each other, each second curve corresponding to the aerodynamic slope;
or a numerical simulation algorithm or one or more equations putting, in particular, the thrust to be exerted by the propeller(s), the angle of incidence to be had by the main rotor(s) and the aerodynamic slope, as well as optionally the speed relative to air of the hybrid helicopter, into relation with one another.

12. The method according to claim 1,
wherein determining the value of the thrust to be exerted by the propeller(s) comprises determining a control order for controlling the pitch of the blades of the propeller(s) according to the value of the thrust to be exerted by the propeller(s).

13. The method according to claim 1,
wherein determining the angle of incidence to be had by the main rotor(s) comprises determining a control order for controlling the cyclic pitch and the collective pitch of the first blades of the main rotor(s) according to the angle of incidence to be had by the main rotor(s).

14. The method according to claim 1,
wherein the method includes an additional step of inhibiting the method when the flight phase of the hybrid helicopter is not a said stabilized flight phase.

15. The method according to claim 14,
wherein a non-stabilized flight phase is established whenever any one of the following conditions is satisfied:
the aerodynamic slope of the hybrid helicopter is not constant;
a load factor of the hybrid helicopter is not constant;
the speed relative to air of the hybrid helicopter is not constant;
a pitch angle or a roll angle of the hybrid helicopter is not constant;
a load factor of the hybrid helicopter is not constant; or
an action undertaken by a pilot on a flight control of the hybrid helicopter is detected.

16. The method according to claim 1,
wherein, with the hybrid helicopter including at least one stabilizer provided with at least one movable segment enabling the longitudinal balance of the hybrid helicopter to be controlled, the method includes an additional step of controlling an angular position of the movable segment(s).

17. The method according to claim 1,
wherein the method includes an additional step of reducing a speed of rotation NR of the main rotor(s).

18. A hybrid rotorcraft including:
a fuselage;
at least one main rotor provided with a plurality of first blades and providing the hybrid helicopter with at least part of its lift and/or forward propulsion;
at least one propeller provided with a plurality of second blades and providing the hybrid helicopter with at least part of its forward propulsion;
an automatic piloting device;
at least one sensor determining the flight conditions of the hybrid helicopter; and
at least one calculator;
wherein the calculator is configured to implement the method according to claim 1.

19. A method of reducing in-flight noise for a hybrid helicopter, the method comprising the following steps:
determining flight conditions of the hybrid helicopter, the hybrid helicopter including:
a main rotor having a plurality of first blades to provide the hybrid helicopter with at least part of its lift and/or forward propulsion;

a forward propulsion propeller having a plurality of second blades to provide the hybrid helicopter with at least part of its forward propulsion;
an automatic piloting device; and
at least one calculator;
determining the flight conditions of the hybrid helicopter using a sensor of the hybrid helicopter, the flight conditions including a speed relative to air of the hybrid helicopter and an aerodynamic slope of a path followed by the hybrid helicopter;
determining a value of a thrust to be exerted by the propeller using a first database and as a function of the flight conditions;
determining a value of an angle of incidence to be had by the main rotor using a second database and as a function of the value of the thrust to be exerted by the propeller to limit noise generation due to a vortex wake caused by each rotating blade of the main rotor; and
implementing a stabilized flight phase of the hybrid helicopter by controlling the propeller to exert a thrust commensurate with the value of the thrust to be exerted by the propeller and by controlling the main rotor to have an angle of incidence commensurate with the value of the angle of incidence to be had by the main rotor.

20. The method according to claim 19,
wherein the step of implementing the stabilized flight phase includes the following substep(s):
automatically controlling the propeller using the value of the thrust to be exerted by the propeller, and automatically controlling the main rotor using the value of the angle of incidence to be had by the main rotor by means of the automatic piloting device of the hybrid helicopter; or
determining a first setpoint for application to the propeller as a function of the value of the thrust to be exerted by the propeller;
determining at least one second setpoint for application to the main rotor as a function of the value of the angle of incidence to be had by the main rotor; and
displaying the first setpoint and the second setpoint(s) on a display device of the hybrid helicopter.

* * * * *